United States Patent [19]

Parigot et al.

[11] 4,262,453
[45] Apr. 21, 1981

[54] MACHINE FOR GRINDING HARD WORKPIECES

[75] Inventors: Georges Parigot, Althen des Paluds; Jean-Louis Passerat, Montfavet, both of France

[73] Assignee: Societe Europeenne des Produits Refractaires, Neuilly-sur-Seine, France

[21] Appl. No.: 1,746

[22] Filed: Jan. 8, 1979

[30] Foreign Application Priority Data

Jan. 9, 1978 [FR] France ................... 78 00404

[51] Int. Cl.³ .............................................. B24B 7/02
[52] U.S. Cl. .......................................... 51/93; 51/99; 51/165.9; 51/240 R
[58] Field of Search ............... 51/45, 47, 91 R, 92 R, 51/93, 165.9, 240 R, 99; 308/3 A, 5 R, 9, DIG. 1; 409/186, 187, 193, 194, 196

[56] References Cited

U.S. PATENT DOCUMENTS

| | | | |
|---|---|---|---|
| 2,763,967 | 9/1956 | Hardy et al. | 51/165.9 X |
| 3,277,692 | 10/1966 | Gertel | 308/DIG. 1 |
| 3,476,444 | 11/1969 | Dunfee | 308/5 R X |
| 3,589,072 | 6/1971 | Burt | 51/92 X |
| 3,667,166 | 6/1972 | White | 51/92 R |
| 4,034,517 | 7/1977 | Weatherell | 51/92 R |
| 4,100,700 | 8/1978 | Peirce | 51/92 R |

FOREIGN PATENT DOCUMENTS 1400615 4/1965 France .
1570805 6/1969 France .

*Primary Examiner*—Gary L. Smith
*Assistant Examiner*—Robert P. Olszewski
*Attorney, Agent, or Firm*—Watson, Cole, Grindle & Watson

[57] ABSTRACT

Machine for grinding hard workpieces, with an arm equipped at one end with a grinding tool, a machine base supporting a table on which the workpiece is mounted, and an arrangement for supplying cutting liquid, which comprises in combination:

an arm pivoted to swing up and down in a vertical plane which is fixed in position relative to the support,
means for raising and lowering the arm,
a table supported on hydraulic floatation feet to which a stream of cutting liquid is supplied,
a machine base on which the table is mounted to be mobile thereon,
means for moving the table in two directions on the machine base.

5 Claims, 3 Drawing Figures

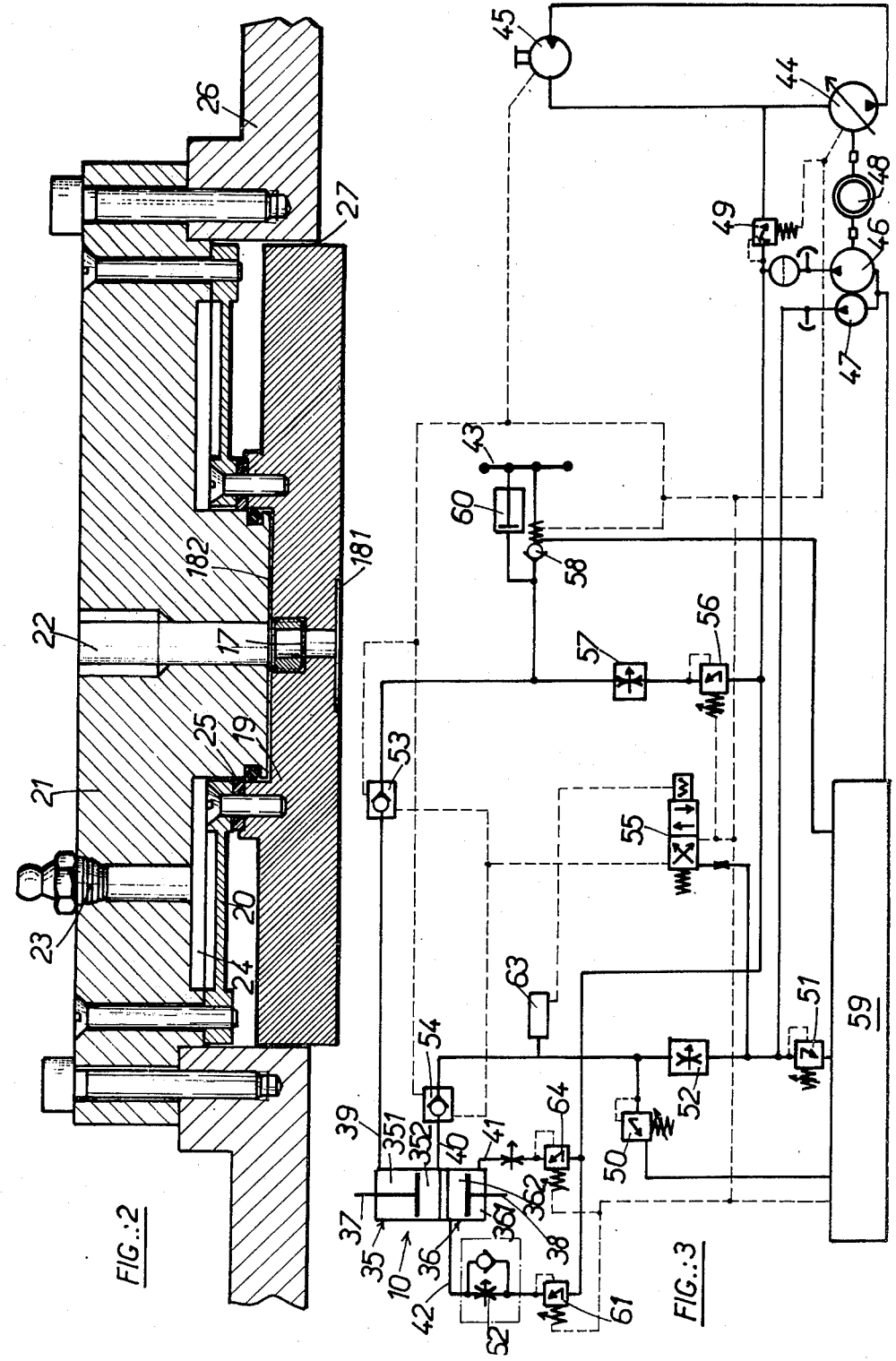

MACHINE FOR GRINDING HARD WORKPIECES

The invention relates to a machine for grinding hard workpieces such as refractory products, castings, mouldings or agglomerates based on oxides, carbides, nitrides, borides or mixtures of these, also steel and metal alloys, the machine having an arm equipped at one end with a grinding tool and a machine base supporting a table on which the workpiece is mounted.

Grinding large and hard workpieces such as refractory products based on zirconium or aluminium oxides, and which can weigh 600 kg or more, has hitherto been done using grinding machines of the pendulum type, equipped with tools of silicon carbide. A machine of this kind has a machine frame in the form of two massive columns supporting at their upper ends a crossbeam on which pivots the arm equipped with the grinding tool. Fixed to one end of the arm, in addition to the grinding tool, are control handles for the operator. The other end of the arm supports the driving motor for the tool, i.e. the grinding wheel, whose height is adjustable by means of a jack.

The grinding wheels have bodies in which abrasive particles are imbedded in ceramic or resin binders. From the surface region of the grinding body abrasive particles are constantly being torn out by a fracturing process. Consequently the wheel develops irregularities of shape, which give rise to considerable vibrations at various and changing frequencies. The resulting noise and the vibrations, combined with the efforts exerted by the operator in controlling the machine, and the ambient humidity, result in difficult working conditions.

The vibrations deriving from the grinding process are transmitted, in the one direction, to the workpiece and to the table on which it rests and, in the other direction, to the spindle of the grinding wheel and its supports. In most machines of this kind both the workpiece and the grinding-wheel spindle are rigidly connected to the machine frame, to give precision in the grinding, and consequently the machine frame is subjected to a combination of vibrations from the two sources, i.e. from the workpiece through its supporting table and from the spindle of the grinding wheel through the grinding wheel supports. Further vibrations at various frequencies are produced by the longitudinal and transverse movements of the table on which the workpiece is mounted.

These problems can be partly solved by using diamond grinding wheels, but this is costly and hardly increases output.

The essence of the problem tackled in the present invention, assuming that carbide grinding wheels are used, is therefore to reduce, or entirely suppress, the noise and the vibration, to reduce the effort expended in controlling the machine, and to increase its output.

In solving this problem the invention provides, in the first place, remote control for the operator, relieving him of effort and freeing him from vibrations. Mechanical vibrations transmitted to the table from the arm which supports the grinding wheel, and from the table supporting the workpiece, are reduced by supporting the table on a hydraulic cushion.

The machine according to the invention, for grinding hard workpieces, with an arm equipped at one end with a grinding tool, a machine base supporting a table on which the workpiece is mounted, and an arrangement for supplying cutting liquid, is characterized by a combination of the following features:

an arm pivoted to swing up and down in a vertical plane which is fixed in position relative to the support,
means for raising and lowering the arm,
a table supported on hydraulic floatation feet to which a stream of cutting liquid is supplied,
a machine base on which the table is mounted to be mobile thereon,
means for moving the table in two directions on the machine base.

The invention will be better understood with the help of the Figures, which represent an example of the invention.

FIG. 2 is a cross section of one of the hydraulic floatation feet of the table.

FIG. 3 is a diagram showing the hydraulic circuit for raising and lowering the pivoted arm.

Figure 1:
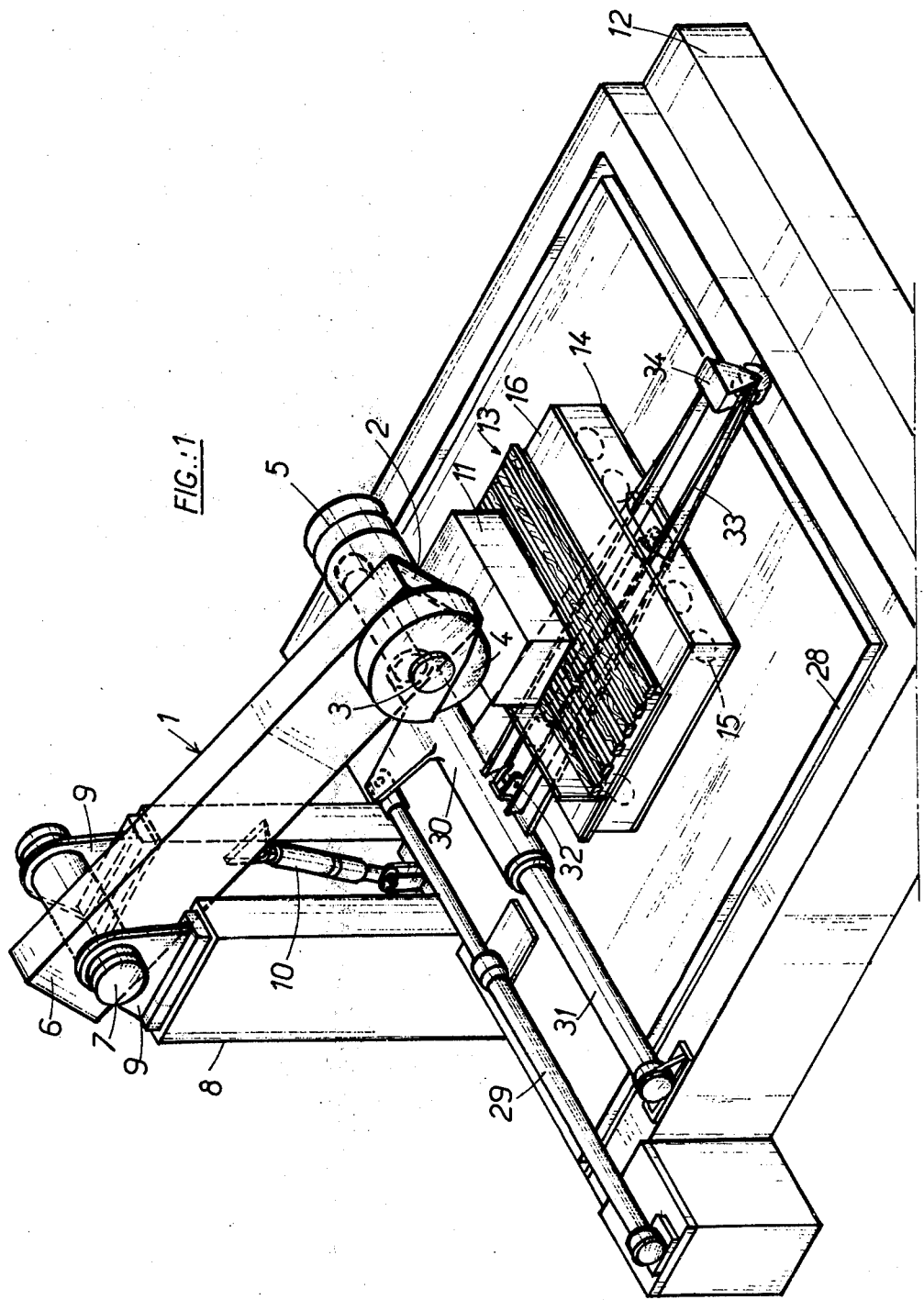
FIG. 1 is a perspective view of an example of the grinding machine according to the invention.

In FIG. 1 a pivoted arm 1 supports in bearings, near its free end 2, a spindle 3 to which is fixed a grinding wheel 4, the spindle 3 being driven in rotation by a motor 5 which is, in this example, a variable-speed hydraulic motor taking driving fluid from a variable-output pump. The speed of the grinding wheel can be varied between 0 and 3000 revolutions per minute.

The pivoted arm 1 comprises a core welded between two U-section steel members, forming a very rigid structure.

The pivot end 6 of the arm 1 is fixed to a transverse axle 7 which rotates in bearings in supports 9 mounted on columns 8. The bearings, represented only diagrammatically in the drawing, can conveniently comprise a pair of self-aligning spherical roller bearings, to give the arm 1 a stable pivoting movement in a plane truly parallel to the plane of the grinding wheel.

For raising and lowering the pivoted arm 1 a powered device, in this example a hydraulic jack 10, acts between the columns 8 and the pivoted arm 1. The method of functioning of the hydraulic jack 10 will be described further below.

The workpiece 11 is mounted on a table 13, itself supported by a machine base 12. The table 13 is a rigid box structure whose bottom 14 (the base-plate 26 in FIG. 2) is equipped with equally distributed hydraulic floatation feet 15, so that the table 13 rests on the machine base 12 in a cushioned manner. In the example shown, the table 13 is 1250 mm long by 850 mm wide, and it has altogether ten hydraulic floatation feet 15, arranged in two rows of five in each row. The workpiece 11 is clamped to the top 16 of the table 13 by clamping devices which are merely suggested in the drawing, for example by hydraulic vices.

The hydraulic floatation feet 15 are circular structures each having a central lower outlet for the cushioning fluid, as will presently be described. The cushioning effect serves to damp out movements of the table 13, which is loaded not only statically but also by the forces produced by the grinding operations.

A hydraulic floatation foot 15 is represented sectioned in FIG. 2. Floatation fluid is expelled downwards through the foot 15, through a narrow nozzle 17 of the kind called a "thin-wall nozzle", from which the fluid issues turbulently through a lower outlet recess 181. Instead of the thin-wall nozzle 17, a capillary passage can be used. The floatation fluid is conveniently a cutting liquid, in this example water, a liquid with little dynamic viscosity, and consequently the gap between the table and the machine base can be quite narrow, giving the table precise support and keeping the consumption of cutting liquid within tolerable limits.

To compensate for imperfect flatness of the machine base upper surface and for irregularities in this surface, each hydraulic floatation foot 15 has a circular shoe 19 fixed to an annular flexible diaphragm 20, which allows the shoe 19 a limited freedom of vertical movement, relative to the base plate 26 of the table 13, and allows the shoe to tilt to a limited extent. The annular diaphragm 20 is fixed at its outer edge to a circular cap 21, which contains:

a feed channel 22 for feeding floatation fluid to the outlet recess 181 and also to a chamber 182, a grease channel 23 through which a viscous substance is injected into a chamber 24.

The viscous substance, for example grease, prevents escape of water from the chamber 182 past a possibly ruptured sealing ring 25 interposed between the shoe 19 and the diaphragm 20. The function of the chamber 182, containing water under pressure, is to apply a resilient downwards bias thrust to the shoe 19, to optimize operating conditions and to keep the consumption of floatation water within tolerable limits.

The cap 21 of the floatation foot 15 is fixed in a bore 27 of the bottom plate 26 of the table 13, the diameter of the bore 27 being sufficient to allow the shoe 19 freedom of vertical and tilting movements.

The main advantage of supporting the workpiece on a table equipped with hydraulic floatation feet is that the supporting films of water absorb vibrations from the table. Tests have shown that the amplitude of vibration is reduced by a factor of 14, compared to conventional workpiece-supporting tables. A further considerable advantage is that the floatation feet replace mechanical parts interposed between the table and the machine base and giving rise to friction during horizontal movements of the table. By virtue of the hydraulic cushions, the table moves freely in all horizontal directions, irrespective of workpiece weight.

The machine base 12 is a block of concrete with an upper surface dressed to be flat. A run-off gutter 28 is provided for recovering floatation liquid, as well as cutting liquid from the grinding operation, the liquid being returned to the arrangements for feeding cutting liquid to the tool, and to the pump which supplies floatation liquid to the floatation feet.

Easy horizontal movement of the table over the upper surface of the concrete machine base is ensured, in spite of the surface irregularities and imperfect flatness unavoidable in a structure of that kind, by the supporting of the table on a system of hydraulic floats.

For producing the desired horizontal movements of the table, the machine base has a screw-threaded transverse shaft 29, i.e. extending perpendicular to the plane of the grinding wheel. The transverse threaded shaft 29 drives a threaded bush fixed to a slide 30, which slides transversely on a smooth shaft 31. Extending longitudinally, i.e. parallel to the plane of the grinding wheel, is a further screw-threaded shaft 32 working in a threaded bush fixed to the table 13, for giving the table its longitudinal movements. The threaded shaft 32 extends through the interior of the table 13, which is guided in its longitudinal movements by a guide rail 33 fixed at one end to the slide 30. The guide rail 33 has, on its other end, a support 34 equipped with a roller.

The machine base 12 and the columns 8 are concrete blocks and together form a single structural unit, giving the machine a great stiffness. The films of water supporting the table interrupt the transmission of vibrations from the workpiece to the machine base, and the considerable mass of this absorbs vibrations deriving from the spindle of the grinding wheel. The machine frame itself is supported on the workshop floor through vibration dampers, to prevent residual vibrations from invading neighbouring work stations.

The pivoted arm 1 of the grinding machine is raised and lowered by the jack 10. The hydraulic system for effecting this is represented in FIG. 3. In a preferred version of the invention the hydraulic system also acts to prevent the pivoted arm 1 from applying an excessive downwards force to the grinding wheel 4, i.e. a force which might cause the grinding wheel to burst. For these purposes, the jack 10 has two double-effect cylinders 35, 36, in line with each other, each containing a piston 37, 38, the two piston rods being pivoted respectively to the arm 1 and the columns 8. Connected to the two cylinders 35, 36 are hydraulic passages 39, 40 and 41, 42, the passages containing valves 53, 54 which are hydraulically controlled, as will be explained presently.

The operator of the grinding machine controls the raising and lowering of the pivoted arm by actuating a reaction-force-sensitive control lever 43 which transmits back to him, so that he can feel it, the upwards force applied by the workpiece to the grinding wheel.

It should be understood that the entire hydraulic system of the machine, comprising pumps, a tank for hydraulic fluid and the necessary instrumentation, controls not only the movements of the pivoted arm and the driving of the grinding wheel, but also the mechanisms for moving the table and the clamps for holding the workpiece on the table.

Nevertheless, in order to keep the circuit diagram tolerably simple, only the portion of the hydraulic system concerned with the movements of the pivoted arm and the driving of the grinding wheel are shown in the drawing.

The hydraulic motor 45 which drives the grinding wheel is fed with hydraulic fluid by a variable-output pump 44 through a pressure-limiting device which is not shown in the drawing, the pump 44 being powered by an electric motor 48 which also drives a 2-stage pump 46, 47.

The 2-stage pump 46, 47 supplies fluid to two hydraulic circuits:

First hydraulic circuit: the first stage 46 of the pump delivers fluid through a pressure-limiting valve 49 to the outlet channel of the grinding-wheel motor 45, and also delivers fluid to the chamber 351 of the jack 10, for raising and lowering the pivoted arm, the pressure-limiting valve 49 giving priority to the flow going to chamber 351.

Second hydraulic circuit: the second stage 47 of the pump supplies fluid to chamber 352 of the jack 10.

Branching off from the first hydraulic circuit two other channels, containing pressure-limiting valves and constricted orifices, feed the two chambers 361, 362 of the lower portion 36 of jack 10.

The raising and lowering of the pivoted arm of the grinding machine will now be described.

In the first place, a constant sustaining pressure is applied to chamber 352 under the piston 37, for supporting the pivoted arm, by the second stage 47 of pump 46, 47, this pressure being controlled, for example at about 20 bars, by a pressure-limiting valve 50. In parallel with pressure-limiting valve 50 there is a further pressure-limiting valve 51, but this responds at a higher pressure, (for example 35 bars), to allow for the pressure drop across a constricted orifice 52.

For raising and lowering the pivoted arm, the two valves 53, 54 are hydraulically controlled by a pressure distributor 55, itself electrically controlled. Switching on the pumps applies a voltage to distributor 55 (the electric control system is shown in broken lines), which responds by opening the valves 53, 54 and also a valve 58, which communicates with a tank 59 for hydraulic fluid. This raises the pivoted arm to its upper limiting position, its upward speed being limited by constricted orifice 52. On the other hand, if the pressure in the hydraulic circuit feeding valve 54 falls below a specified threshold value (20 bars), this is detected by a pressure detector 63, which responds by applying a signal to the distributor 55, which in turn responds by closing the valves 53, 54, immobilizing the pivoted arm in its existing position.

To lower the pivoted arm, hydraulic fluid has to be supplied to chamber 351, above the upper piston 37, by the first stage 46 of pump 46, 47 through a pressure-limiting valve 56, a constricted orifice 57 and the valve 53 of chamber 351. However, a control cylinder 60 of the reaction-force-sensitive control lever 43, which is actuated manually by the operator, communicates with the hydraulic channel between the constricted orifice 57 and the valve 53 and consequently, until the control lever 43 is actuated by hand, the pressure in the hydraulic circuit keeps this lever in its position of rest, holding valve 58 open and allowing fluid to return to tank 59. On the other hand, as soon as the operator actuates control lever 43, at least partly closing valve 58, pressure builds up in chamber 351, tending to lower piston 351, and with it the pivoted arm, the pressure being nevertheless limited to less than what might cause bursting of the grinding wheel. Subsequently, when the operator releases his control lever 43, fluid again escapes through valve 58 and the pivoted arm returns automatically to its highest limiting position.

The speed of descent of the pivoted arm is limited, ultimately, by constricted orifice 57, but the speed of descent is controlled, between zero and this limit, by the operator, by suitably adjusting his control lever 43.

The safety actions of the system, involving the same circuits and devices, will now be described.

The first requirement is to immobilize the pivoted arm in its working position, after it has been lowered by the operator with the help of control lever 43. To immobilize the arm, the operator opens the electric switch of distributor 55. This closes the two valves 53 and 54, locking the arm in position. During operation of the grinding machine, excessive loading of the grinding wheel, involving a risk of bursting, is prevented by the lower portion 36 of the hydraulic jack. The pressure in the lower chamber 361 of the lower portion 36 of the jack is held constant, during the grinding operation, by a pressure-limiting valve 64 at the highest safe pressure, so that the grinding wheel cannot be loaded beyond its tolerable limits. As soon as the arm rises, it has to be supported to prevent its weight from being added to the cutting load applied to the grinding wheel. For this purpose a constant pressure, tending to lift the pivoted arm, is maintained in chamber 362 by a pressure-limiting valve 61. The thrusts applied to the two upper and the two lower piston faces are dimensioned as follows: The area ratio between the base of chamber 362 and the piston rod in chamber 361 is 2:1. The pressures at valves 50 and 61 are the same. The pressure at valve 64 is twice the pressure at valve 61, plus the pressure corresponding to the highest permissible cutting load, which is determined by valve 56.

The speed of descent of the pivoted arm is controlled by a constricted orifice 62.

The movements of the pivoted arm, with or without locking in position, are controlled by a 2-position switch, mounted on a control panel (not shown), connected in series with the pressure-responsive device 63.

Other devices provided for operation of the grinding machine are mounted on the control panel and positioned so that the operator actuates, by remote control:
 with his left hand, all table movements, i.e. longitudinal and transverse travel and combinations of the two,
 with his right hand, raising and lowering of the grinding wheel.

It should be observed that immobilizing the pivoted arm by switching off at the distributor 55 is not only convenient but also, due to the fact that most grinding is done on flat workpiece surfaces, helps to improve the quality of the product. The machine of the present invention produces a better product than do the conventional machines, which have a pendulum action.

The reaction-force-sensitive control lever gives particularly good control when the grinding wheel is being lowered into contact with the workpiece. Control is sensitive and precise and facilitates the more difficult grinding operations, such as the grinding of concave and convex surfaces. With the control lever in a given position, the grinding wheel follows the profile of the workpiece, the cutting load remaining constant.

We claim:

1. A machine for grinding large hard workpieces, with reduced vibrations, comprising:
 an arm pivotally mounted on a support for swinging up and down in a vertical plane from a highest position to a lowest position, the arm being equipped at one end with a grinding tool;
 means for raising and lowering the arm comprising a hydraulic system preventing an excessive downward force on the grinding wheel and allowing an automatic return to the highest position of the grinding wheel when released, the hydraulic system including a double-effect hydraulic jack connected between the arm and the support and having first and second aligned cylinder chambers containing first and second pistons, both cylinders having inlets for hydraulic fluid at each of the ends thereof, the piston rods of the first and second pistons being respectively connected to the arm and to the support, a first constant-pressure hydraulic circuit for feeding hydraulic fluid to one portion of the first chamber for raising the arm, a second higher pressure hydraulic circuit for feeding hydraulic fluid to the other portion of the first chamber, a third hydraulic circuit for feeding hydraulic fluid, at a pressure corresponding to the highest permissible load applied to the grinding tool, to one portion of the second chamber for raising the arm, a fourth hydraulic circuit for feeding hydraulic fluid to the other portion of the second chamber at a pressure which is lower than the pressure in the third circuit but is sufficient for compensating the weight of the arm, the fourth circuit containing a constricted orifice upstream of the inlet to the other portion of the second chamber, hydraulically controlled valves upstream of the inlets to the first cylinder chamber, a distributor for controlling the valves, control means for the distributor and the valves;

manual means and a hydraulic device sensitive to reaction force of the grinding tool on the workpiece, the manual means being hydraulically connected to the raising and lowering means, and the hydraulic device being positioned upstream of the valve in the second circuit;

a table on which the workpiece is mounted, the table being supported on hydraulic flotation feet to which a stream of cutting liquid is supplied;

a concrete machine base on which the table is mounted to be mobile thereon; and means for moving the table in two directions on the machine base.

2. Machine according to claim 1, characterized in that the hydraulic device sensitive to reaction force comprises a single-effect control cylinder connected in parallel with a valve, and a control lever fixed to the piston of the control cylinder and to the mobile member of the valve.

3. Machine according to claim 2, characterized in that each hydraulic floating foot has a pressure chamber filled with viscous substance, the chamber being formed by a flexible diaphragm interposed between the cap and the shoe.

4. Machine according to claim 3, characterized in that the support comprises columns which, together with the machine base, at least partly comprise concrete blocks.

5. Machine according to claim 4, characterized in that the means for moving the table comprises at least two screw-threaded shafts working in threaded bushes, one shaft being for transverse travel of the table, in directions perpendicular to the plane of the grinding tool, the other for longitudinal travel, the latter shaft being fixed directly or indirectly to the bush of the first shaft.

* * * * *